July 2, 1946.                A. W. PHILLIPS                2,403,191
                                COOKING UTENSIL
                             Filed Sept. 7, 1943              2 Sheets-Sheet 1

Inventor
Alvin W. Phillips

By Clarence A. O'Brien
and Harvey B. Jacobson
                      Attorneys

July 2, 1946.                A. W. PHILLIPS                2,403,191
                              COOKING UTENSIL
                           Filed Sept. 7, 1943          2 Sheets-Sheet 2
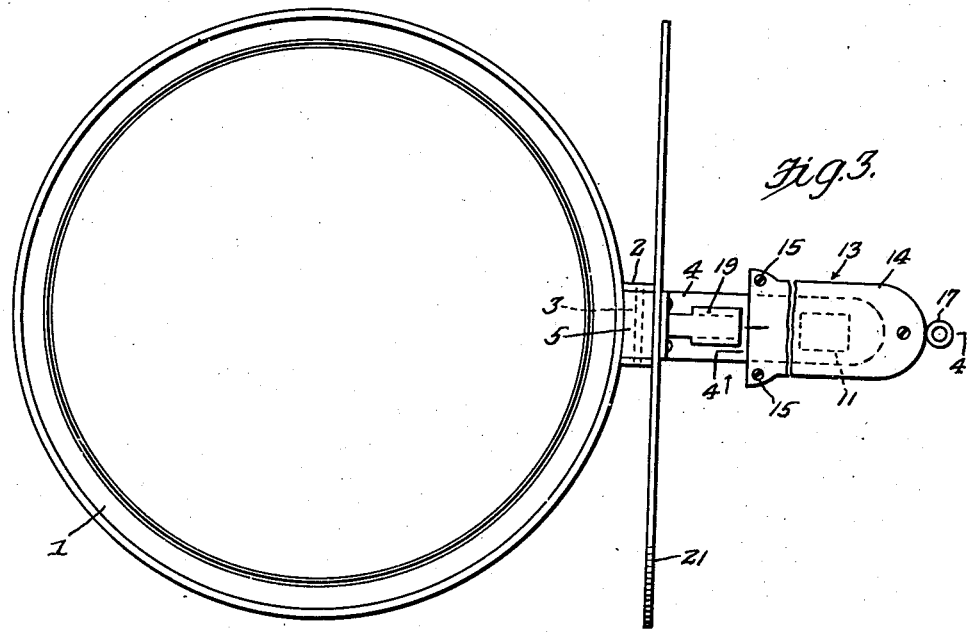
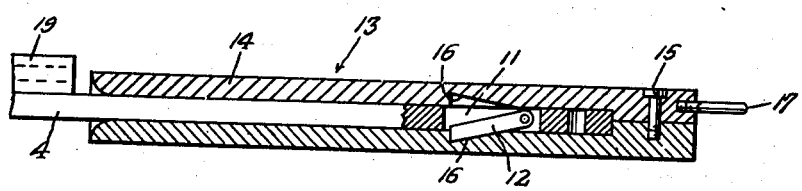
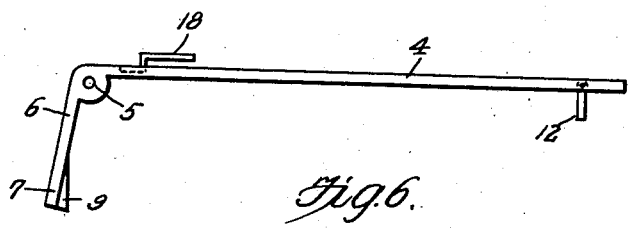
Inventor
Alvin W. Phillips
By Clarence A. O'Brien
and Harvey B. Jacobson
Attorneys Patented July 2, 1946

2,403,191

UNITED STATES PATENT OFFICE 2,403,191

COOKING UTENSIL

Alvin W. Phillips, Mackinaw, Ill.

Application September 7, 1943, Serial No. 501,487

3 Claims. (Cl. 220—94)

The present invention relates to new and useful improvements in domestic cooking utensils, particularly skillets, and has for its primary object to provide a device of this character comprising a detachable or removable handle which includes novel securing means.

Another very important object of the invention is to provide a cooking utensil of the aforementioned character comprising a pivotally mounted handle and a cover secured thereon, which cover will be swung to raised or open position when said handle is swung to operative position.

Other objects of the invention are to provide a cooking utensil of the character described which will be comparatively simple in construction, strong, durable, highly efficient and reliable in use, compact, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 3 is a top plan view of the device.

Figure 4 is a view in vertical longitudinal section, taken substantially on the line 4—4 of Figure 3.

Figure 6 is a detail view in side elevation of the swinging arm.

Figure 1:
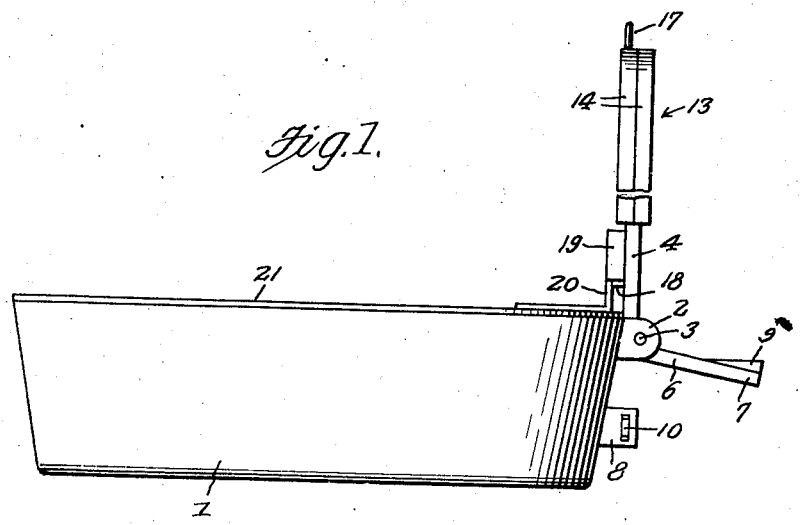
Figure 1 is a view in side elevation of a skillet embodying the present invention, showing the cover in closed position and the handle in a vertical or inoperative position.
Figure 2:
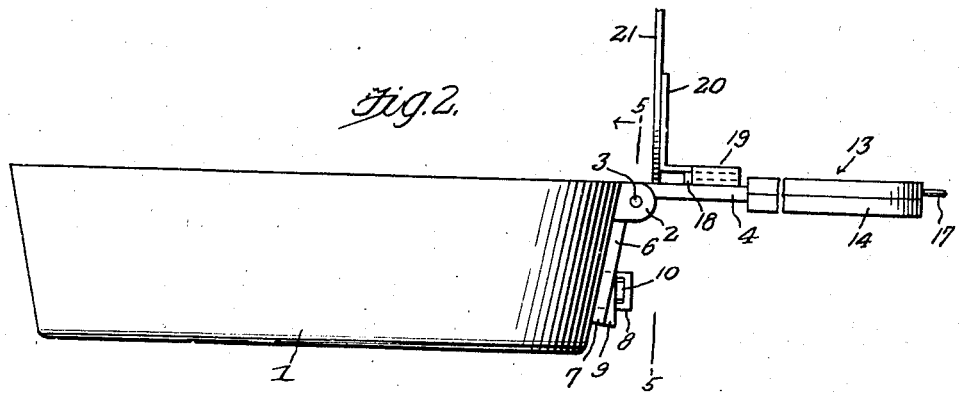
Figure 2 is a side elevational view of the device, showing the handle in horizontal or operative position and the cover raised to open position.
Figure 7:
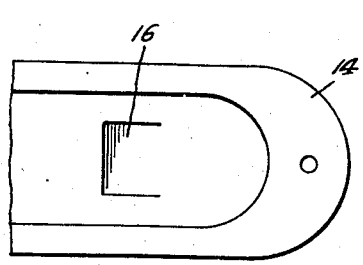
Figure 7 is a plan view of a portion of one of the sections of the removable handle.
Figure 5:
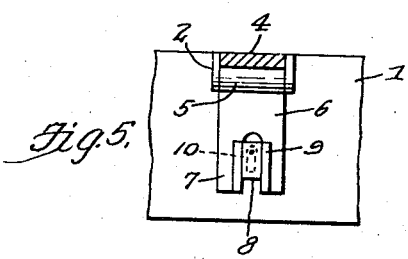
Figure 5 is a cross-sectional view, taken substantially on the line 5—5 of Figure 2.

Referring now to the drawings in detail, it will be seen that the embodiment of the invention which has been illustrated comprises a skillet 1 which is preferably of cast iron. Projecting from the upper portion of the skillet 1, at the rear thereof, is a pair of apertured ears 2. A pin 3 extends between the ears 2.

Mounted for swinging movement in a vertical plane on the pin 3 is an arm 4. The arm 4 includes an eye 5 on one end which is journaled on the pin 3. Depending from the pivoted end of the arm 4 is a foot 6 which is engageable with the skillet 1 for limiting downward swinging movement of said arm thereon to a horizontal position.

The lower portion of the foot 6 comprises bifurcations 7 which straddle a lug 8 which projects from the skillet 1. Ribs 9 are provided on the inner marginal portions of the bifurcations 7. Mounted for lateral swinging movement in a transverse opening which is provided therefor in the lug 8 is a gravity-actuated latch 10 which, when the skillet 1 is tipped for pouring, swings into engagement with one of the ribs 9, thereby positively locking the skillet against swinging movement on the arm 4.

The arm 4 has formed therein an opening 11. A gravity-actuated dog 12 is pivotally mounted for swinging movement in the opening 11. This is shown to advantage in Figure 4 of the drawings.

Removably mounted on the arm 4 is a handle 13 of plastic or other suitable material. The handle 13, which is adapted to be slipped on and off the arm 4, comprises complemental half-sections 14 which are secured together by countersunk screws 15. The sections 14 of the handle 13 have formed in their opposed faces notches or recesses 16 for communication with the opening 11. The dog 12 is engageable by gravity in either of the notches 16, according to which is lowermost when the handle is in a horizontal position, for releasably securing said handle in position on the arm 4. An eye screw 17 is mounted in the inner end of the handle 13 for hanging said handle up when it is not in use.

Mounted on the arm 4 forwardly of the removable handle 13 and paralleling said arm is a bar 18. The bar 18 is adapted to receive a sleeve 19 on one end of an angular bracket 20 having fixed thereon a cover 21 for the skillet 1. It will thus be seen that the cover 21 is mounted for swinging movement with the arm 4.

It is thought that the operation of the device will be readily apparent from a consideration of the foregoing. Briefly, with the arm 4 in a vertical position, as seen in Figure 1 of the drawings, the cover 21 is in closed position on the skillet 1. With the arm 4 in this raised position, the dog 12 hangs vertically in the opening 11 and the handle 13 may be readily removed. Thus, the handle 13 may be kept cool. When the handle 13 is to be used, it is slipped downwardly on the vertical arm 4. The handle 13 and the arm 4 are then swung downwardly to a horizontal position, during which operation the dog 12 drops by gravity into the lowermost notch or recess 16 for positively locking said handle on said arm. When the members 13 and 4 are swung downwardly to a horizontal or operative position for lifting the skillet, the cover 21 is raised to open position. The skillet 1 may now be tipped in either direction for pouring the contents thereof. As hereinbefore indicated, when this occurs, the gravity-actuated latch 10 swings laterally over one of the ribs 9 for locking the foot 6 to the skillet 1, thereby positively securing said skillet against swinging movement.

It is believed that the many advantages of a cooking utensil constructed in accordance with the present invention will be readily understood, and although a preferred embodiment of the device is as illustrated and described, it is to be understood that changes in the details of construction may be resorted to which will fall within the scope of the invention as claimed.

What is claimed is:

1. A cooking utensil comprising a receptacle, an arm carried by and projecting outwardly from said receptacle in a substantially horizontal position when in use, said arm having a vertical opening through the outer portion thereof, a hollow handle snugly telescoped over the outer end portion of the arm and having an internal recess therein beneath and registered with said vertical opening of the arm, and a dog freely pivoted at one end to said arm within said opening for vertical swinging movement, said dog normally gravitating to a lowered position with its other end engaged in said recess to secure the handle on the arm and being movable by gravity to a position out of engagement with the recess and wholly within said opening to permit removal of the handle from the arm when the latter is disposed in an upwardly projecting vertical position.

2. A cooking utensil comprising a receptacle, an arm carried by and projecting outwardly from said receptacle in a substantially horizontal position when in use, the outer portion of said arm having a vertical opening therethrough, a hollow handle snugly telescoped over the outer end portion of the arm and having opposed internal recesses therein registered with said vertical opening above and below the arm, and a dog freely pivoted at one end to said arm within said opening for vertical swinging movement, said dog normally gravitating to a lowered position with its other end engaged in the recess below the arm to secure the handle on the arm and being movable by gravity to a position out of engagement with the recess and wholly within said opening to permit removal of the handle from the arm when the latter is disposed in an upwardly projecting vertical position, said opposed recesses providing for securing the handle on the arm regardless of which recess is disposed beneath the opening.

3. A cooking utensil comprising a receptacle, an arm hinged to said receptacle for vertical swinging movement so as to assume a horizontal operative position and an upwardly projecting vertical inoperative position, said arm having an opening therethrough which is vertically disposed when the arm is in its operative position, a hollow handle snugly telescoped over the outer end portion of the arm and having an internal recess therein beneath and registered with said vertical opening of the arm, and a dog freely pivoted at one end to said arm within said opening for vertical swinging movement, said arm gravitating to a lowered position with its other end engaged in said recess to secure the handle on the arm when the latter is in operative position, and being movable by gravity to a position out of engagement with the recess and wholly within said opening to permit removal of the handle from the arm when the latter is swung upwardly to the vertical inoperative position.

ALVIN W. PHILLIPS.